(12) United States Patent
Zhang et al.

(10) Patent No.: US 11,654,479 B2
(45) Date of Patent: May 23, 2023

(54) COMPOSITE EQUAL ADDITIVE MANUFACTURING METHOD

(71) Applicant: HUAZHONG UNIVERSITY OF SCIENCE AND TECHNOLOGY, Wuhan (CN)

(72) Inventors: Hai'ou Zhang, Wuhan (CN); Jianwu Huang, Wuhan (CN); Guilan Wang, Wuhan (CN)

(73) Assignee: Huazhong University of Science and Technology, Hubei Province (CN)

( * ) Notice: Subject to any disclaimer, the term of this patent is extended or adjusted under 35 U.S.C. 154(b) by 0 days.

(21) Appl. No.: 17/585,729

(22) Filed: Jan. 27, 2022

(65) Prior Publication Data

US 2022/0234098 A1 Jul. 28, 2022

(30) Foreign Application Priority Data

Jan. 28, 2021 (CN) .......................... 202110115024.1

(51) Int. Cl.
| | |
|---|---|
| *B22D 11/00* | (2006.01) |
| *B22D 23/00* | (2006.01) |
| *B33Y 10/00* | (2015.01) |
| *B33Y 40/20* | (2020.01) |
| *C22B 9/18* | (2006.01) |

(Continued)

(52) U.S. Cl.
CPC ............ *B22D 23/003* (2013.01); *B21B 1/463* (2013.01); *B22D 11/006* (2013.01); *B22D 11/0406* (2013.01); *B33Y 10/00* (2014.12); *B33Y 40/20* (2020.01); *C22B 9/18* (2013.01)

(58) Field of Classification Search
CPC ............................. B21J 5/004; B22D 11/006
See application file for complete search history.

(56) References Cited

U.S. PATENT DOCUMENTS

| | | | | | |
|---|---|---|---|---|---|
| 3,708,010 | A | * | 1/1973 | Simons ................ | B22D 11/006 164/489 |
| 3,844,332 | A | * | 10/1974 | Bucci ................... | B22D 11/006 164/486 |

(Continued)

FOREIGN PATENT DOCUMENTS

WO WO-2020120919 A1 * 6/2020 ........... B22D 11/001

*Primary Examiner* — Jacob J Cigna
(74) *Attorney, Agent, or Firm* — C. Tumey Law Group PLLC

(57) ABSTRACT

A composite equal additive manufacturing method: S1, obtaining molten metal by using a metal smelting device; S2, first, storing inflow molten metal in an intermediate container, and then transferring the molten metal into a crystallizer; S3, cooling the molten metal to a solid-liquid mixed state by using the crystallizer, and enabling a high-temperature blank body with a required section to flow out from an outlet of the crystallizer; S4, arranging plastic forming tools at a bottom of the outlet of the crystallizer, and performing plastic forming on the outflow high-temperature blank body; S5, fixing a lower end of a part after the plastic forming and slowly descending the part by a chuck; S6, machining the part by using point forming machines, and synchronously controlling the machining temperature of the part; and S7, descending the chuck to an appropriate position, and taking the formed part out from the machine frame.

8 Claims, 10 Drawing Sheets

(51) Int. Cl.
*B21B 1/46* (2006.01)
*B22D 11/04* (2006.01)

(56) References Cited

U.S. PATENT DOCUMENTS

| | | | | |
|---|---|---|---|---|
| 4,546,816 A | * | 10/1985 | Schwarz | B22D 11/006 164/465 |
| 5,052,469 A | * | 10/1991 | Yanagimoto | B22D 11/006 164/483 |
| 8,074,704 B2 | * | 12/2011 | Blackburn | B22D 11/006 164/443 |

* cited by examiner

COMPOSITE EQUAL ADDITIVE MANUFACTURING METHOD

CROSS REFERENCE TO RELATED APPLICATION(S)

This patent application claims the benefit and priority of Chinese Patent Application No. 202110115024.1, filed on Jan. 28, 2021, the disclosure of which is incorporated by reference herein in its entirety as part of the present application.

TECHNICAL FIELD

The present disclosure relates to the technical field of part forming and manufacturing, and in particular, to a composite equal additive manufacturing method.

BACKGROUND ART

A thin-walled part, such as a ring tube part, is a basic part widely used in the industrial fields, such as aerospace, which has a high requirement on formability during a manufacturing process. At present, a manufacturing process for the thin-walled part such as the ring tube part is complex, which involves many links from initial molten metal to a final part, usually including the processes of casting, cogging down, forging, reaming, rolling, machining, and heat treatment. Since equipment or molds involved in each process are different, high time and energy loss are also caused by transferring the part. Therefore, a conventional manufacturing process of the thin-walled part, such as the ring tube part, often has long process and high energy consumption. In addition, with the development of aerospace structural parts towards integration, the thin-walled part, such as the ring tube part, is required to have a complex local structure, and is obtained by methods of machining, welding, or the like in the traditional manufacturing process, which undoubtedly increases the manufacturing cycle and cost of the part. Combined with the above two points, modern industrial manufacturing field has an urgent demand for a new generation of high-efficiency and low-cost complex thin-wall part manufacturing technology.

SUMMARY

An objective of the present disclosure is to provide a composite equal additive manufacturing method to solve the problems in the abovementioned prior art, which can realize integrated forming of a complex thin-walled piece.

To achieve the above objective, the present disclosure provides the following solution that: the present disclosure provides a composite equal additive manufacturing method, including the following steps:

S1, obtaining molten metal by using a metal smelting device;

S2, temporarily storing the molten metal flowing out from the metal smelting device in an intermediate container, and transferring molten metal stored in the intermediate container into a crystallizer below through a gate when the molten metal flowing into the intermediate container meets a forming amount of a part to be formed;

S3, controlling the crystallizer to cool the molten metal from a liquid state to a solid-liquid mixed state, and enabling a high-temperature blank body with a required section to flow out from an outlet of the crystallizer;

S4, arranging one or more pairs of plastic forming tools at a bottom of the outlet of the crystallizer, and performing hot machining on the blank body with fluidity by the plastic forming tools;

S5, enabling the blank body after plastic forming to descend under the action of self gravity, where a chuck is used for clamping and fixing a lower end of a cooled and solidified blank body, and the fixed blank body descends along a guide sleeve on a machine frame;

S6, performing local machining or finishing on the blank body on the chuck after the plastic forming by using one or more point forming machines, and simultaneously, adjusting and controlling the temperature of a machining part by using a temperature control device, so as to obtain a formed part with a locally deformed structure; and S7, after the forming is completed, supporting the formed part by the chuck, enabling the deformed part to descend to a bottom of the machine frame, and taking the formed part out from the machine frame by using other equipment.

Preferably, in S1, one electrode of a power supply in an electroslag remelting furnace is directly placed in a slag pool, a hole is formed in a bottom of the slag pool, and the molten metal flows out from the hole machined in the bottom of the slag pool.

Preferably, in S2, the intermediate container is used for storing the molten metal and controlling the speed of the molten metal flowing into the crystallizer.

Preferably, the crystallizer is of a hollow axisymmetric structure or non-axisymmetric structure.

Preferably, in S4, a plastic forming tool is one or more pairs of rolls. Each pair of rolls includes an inner roll and an outer roll. The inner roll rotates around a mandrel through a bearing. The outer roll is placed in a disc fixed by the guide sleeve and rotates around the mandrel in a disc groove.

Preferably, in S5, the periphery of the chuck is connected to a sliding guide sleeve. The sliding guide sleeve is assembled on a guide rod of the machine frame and can move up and down along the guide rod of the machine frame.

Preferably, in S6, the plastic forming tool consists of an inner point forming machine and an outer point forming machine. The inner point forming machine can rotate along the mandrel and can stretch and retract relative to the guide sleeve on the mandrel. The outer point forming machine is placed in the disc fixed by the guide sleeve and rotates around the mandrel in the disc groove. The inner point forming machine and the outer point forming machine are used for machining a local structure on the blank body.

Preferably, a temperature control device is installed on or near a machining head of the point forming machine. The temperature control device is used for adjusting and controlling the temperature of a machining part.

Compared with the prior art, the present disclosure achieves the following beneficial technical effects.

(1) A manufacturing process of the thin-walled part, such as the ring tube part, can be remarkably reduced. An ultra-short process manufacturing and synchronous control of shape and properties of the thin-walled part, such as the ring tube part, can be realized through one device. The structure and the properties are more uniform. The time cost is greatly saved, the energy consumption is reduced, and the production efficiency is improved.

(2) The shape formation and the property formation of the part are realized by using plastic forming, such as rolling, under the condition that the blank body has high temperature and good fluidity, and the local structure is machined through the plastic forming tool, such as one or more point forming machines, so that integrated forming of the complex thin-walled part can be realized.

(3) Due to the characteristics of additive manufacturing, the method can greatly improve the utilization rate of materials.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description are merely some embodiments of the present disclosure, and those of ordinary skill in the art may still derive other drawings from these accompanying drawings without creative efforts.

DETAILED DESCRIPTION OF THE EMBODIMENTS

Figure 1:
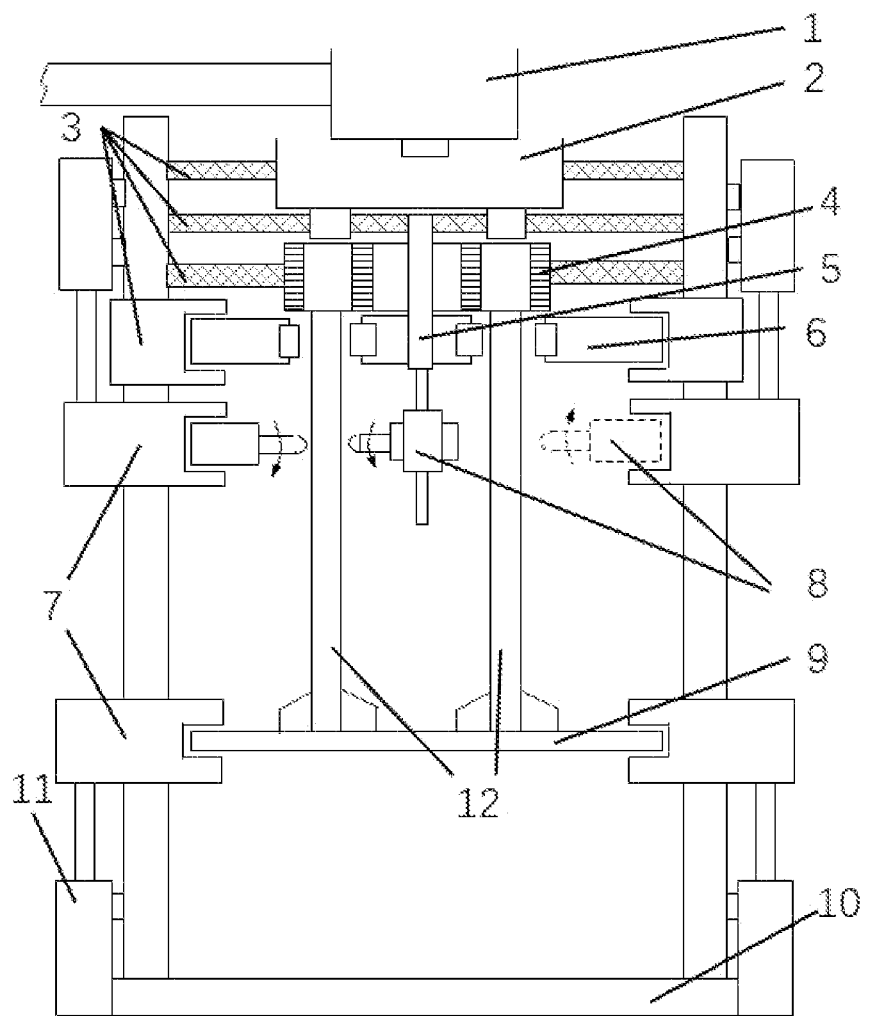
FIG. 1 is a structural schematic diagram of an equal additive manufacturing device.

Technical solutions in the embodiments of the present disclosure will be clearly and completely described herein below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of the present disclosure is to provide a composite equal additive manufacturing method to solve the problems in the abovementioned prior art, which can realize integrated forming of a complex thin-walled piece.

In order to make the abovementioned objective, features, and advantages of the present disclosure more apparent and more comprehensible, the present disclosure is further described in detail below with reference to the drawings and specific implementation manners.

As shown in FIG. 1 to FIG. 10, the present embodiment provides a composite equal additive manufacturing method, including the following steps.

S1. Molten metal is obtained by using a metal smelting device 1. The metal smelting device 1 in the present embodiment adopts an electroslag remelting furnace. Part structures of the electroslag remelting furnace are different from a conventional electroslag remelting furnace, in the present embodiment, one electrode of a power supply of the electroslag remelting furnace is directly placed in a slag pool, which is beneficial to forming a loop and reducing electric leakage situations. In addition, a water-cooled crystallizer on the periphery of the conventional electroslag remelting furnace is removed, and a hole is formed in a bottom. The volume of the molten metal obtained by single consumption of a consumable electrode in the electroslag remelting furnace is equal to the sum of the volume of the part and machining allowance. In addition, the molten metal may also be obtained in manners, such as vacuum smelting. Specifically, an upper end of the consumable electrode and an electrode in the slag pool are connected to the power supply. The consumable electrode is molten through resistance heat. The molten metal is purified by the slag pool, and finally, the molten metal flows into an intermediate container 2 through a small hole in a bottom of the furnace.

S2. The intermediate container 2 temporarily stores the molten metal flowing out from the metal smelting device 1, and when the flowing molten metal is enough to manufacture a part, the stored molten metal is transferred to a crystallizer 4 below through a gate, such as a shower gate, at an appropriate speed.

S3. The crystallizer 4 cools the molten metal from a liquid state to a state with fluidity by a cooling effect. A high-temperature blank body with a required cross section (such as, a circular ring) flows out from an outlet of the crystallizer. If the crystallizer 4 is of an annular structure, an inner ring and an outer ring cooperate to cool the molten metal into an annular blank body.

S4. There is one or more pairs of plastic forming tools, such as rolls 6, at the outlet of the crystallizer 4 to perform hot machining on the high-temperature blank body with good fluidity. When the high-temperature blank body at the outlet of the crystallizer 4 enters an acting range of the plastic forming tools, such as the rolls 6, outer rolls and inner rolls clamp the blank body to rotate around a mandrel 5, so as to perform the hot machining on the high-temperature blank body with good fluidity.

S5. The blank body 12 after plastic forming, such as rolling, descends slowly under the action of its own gravity, and enters a working range of a chuck 9 below the rolls 6. The chuck 9 moves up and down under the action of a hydraulic cylinder 11 on the outer side of a guide rod of a machine frame 10. The chuck 9 clamps a lower end of the part, so as to prevent the part from deflecting in a subsequent point forming process due to uneven stress. The chuck 9 descends slowly along with a guide sleeve on the machine frame 10 after clamping the part. The chuck 9 includes a plurality of clamping jaws, the structure and movement manner of which are the same as those of a multi-jaw pneumatic chuck 9 or a multi-jaw hydraulic chuck 9.

S6. Point forming machines 8 perform local machining on the blank formed through plastic forming, such as rolling. An inner point forming machine reaches a target machining position through the rotation around the mandrel 5 and the up-down movement along the mandrel 5. An outer point forming machine reaches the target machining position through the rotation around a circular guide rail and up-down movement of a guide sleeve used for fixing the circular guide rail. The inner point forming machine and the outer point forming machine are matched with each other to obtain a locally deformed structure on a side of the part. Meanwhile, a temperature control device adjusts and controls the temperature of a machining position.

Figure 10:
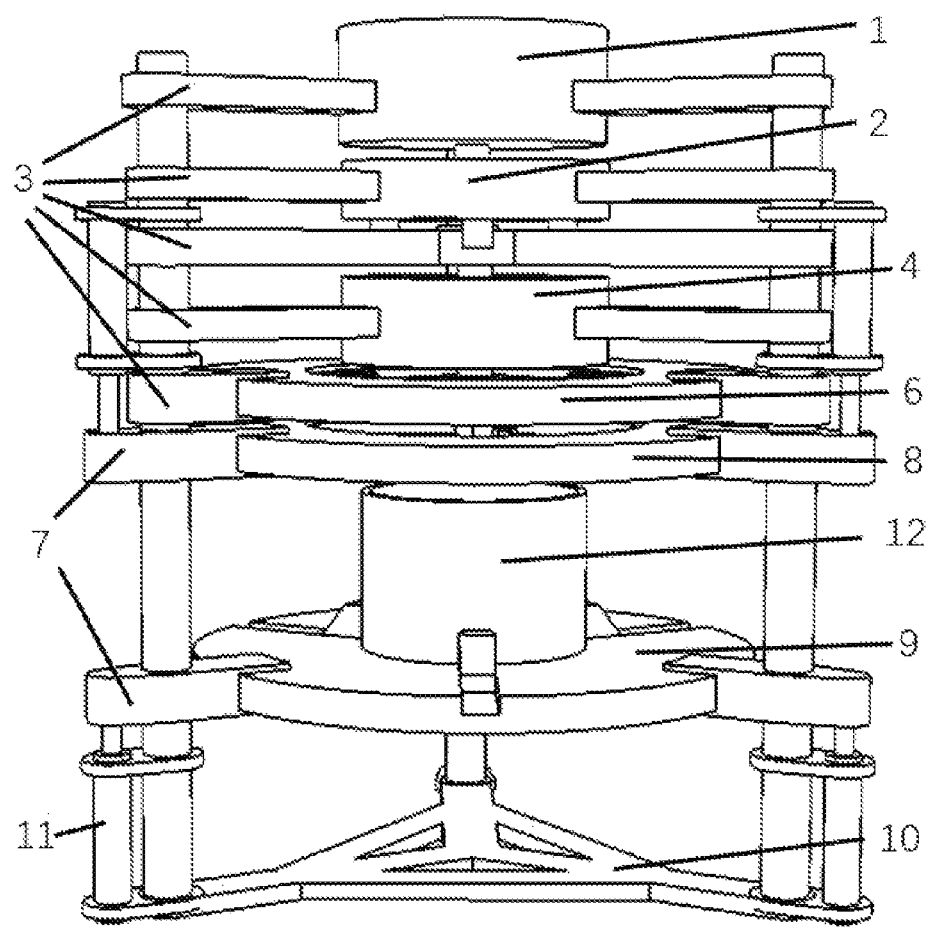
FIG. 10 is a three-dimensional diagram when equal additive manufacturing is ended.

S7. After the forming of the part is completed, the chuck 9 supports the part to be descended to an appropriate position; and the part is taken out from a side of the machine frame 10 by using other equipment. A schematic diagram of a part to be taken out after being machined is as shown in FIG. 10.

Further, in S2, the functions of the intermediate container 2 mainly include storing the molten metal, controlling the speed of the molten metal flowing into the crystallizer 4, and isolating a possible electric leakage situation of the power supply of the metal smelting device 1, so as to control the uniformity of a temperature change during part crystallization through an appropriate gate, such as a shower gate.

In S3, the crystallizer 4 controls the temperature of the blank body within an appropriate range, and the decrease of the temperature of a blank during plastic forming, such as rolling, needs to be considered. In addition, the crystallizer 4 may constrain the shape of molten metal by using electromagnetic force with the help of an electromagnetic casting technology.

In S4, the plastic forming tools, such as rolls 6, include the inner rolls and the outer rolls. The inner rolls and the outer rolls are arranged uniformly in a circumference. The inner rolls are in contact with a bearing and a gear on the mandrel 5. The bearing determines a radial position and an axial position of the inner roll. The gear in the mandrel 5 is externally engaged with gears of the inner rolls. The gears of the inner rolls are driven by a motor. The motor is placed inside an inner roll frame. The outer rolls are placed in a disc fixed by a sliding guide sleeve 7. The central axis of the disc is kept consistent with that of the mandrel 5. The outer rolls are fixed by the same annular gear. The annular gear is externally engaged with a gear in the disc. Meanwhile, the bearings of the outer rolls are placed in a guide rail in a disc groove so as to determine the radial positions thereof. The motor is placed on the disc and is drives the gears in the disc groove to rotate, so that the outer rolls connected to the annular gear rotate around the mandrel 5 along the disc groove. The inner rolls and the outer rolls may rotate synchronously or asynchronously according to rotating speed, and rotate in the same direction or in opposite directions, depending on specific situations.

In S5, the chuck 9 is fixed by the sliding guide sleeve 7, and may move up and down along the guide rod of the machine frame 10 along with the sliding guide sleeve 7. A stroke and speed are uniformly controlled by a general controller.

In S6, the point forming machines 8 include an inner point forming machine and an outer point forming machine. The inner point forming machine may rotate along the mandrel 5 and move up and down. A gear rack is arranged on the mandrel 5 to be engaged with a gear of an inner sliding block. Meanwhile, an annular outer gear is arranged on the outer side of the inner sliding block and is engaged with a gear of an outer sliding block. A motor is placed in each of the inner sliding block and the outer sliding block to control the rotation of the inner sliding gear and the outer sliding gear, and integrates the inner sliding block and the outer sliding block integrally, so as to realize the rotation and the up-down movement of the inner point forming machine. The outer point forming machine is placed in the disc fixed by the sliding guide sleeve 7. The placement and the movement manner of the outer point forming machine in the disc groove are the same as those of a single outer roll. The difference is that the disc may move up and down under the action of the hydraulic cylinder 11 on the outer side of the guide rod of the machine frame 10, thereby driving the outer point forming machine to move up and down. The inner point forming machine and the outer point forming machine cooperate to machine a local structure on the part. The temperature control device may be mounted together with an outer tool head, or temperature control may be realized through electric auxiliary point heating. An inner tool head and the outer tool head are respectively connected to a negative electrode of the power supply, so as to produce heat by using resistance when being in contact with a workpiece.

Figure 2:
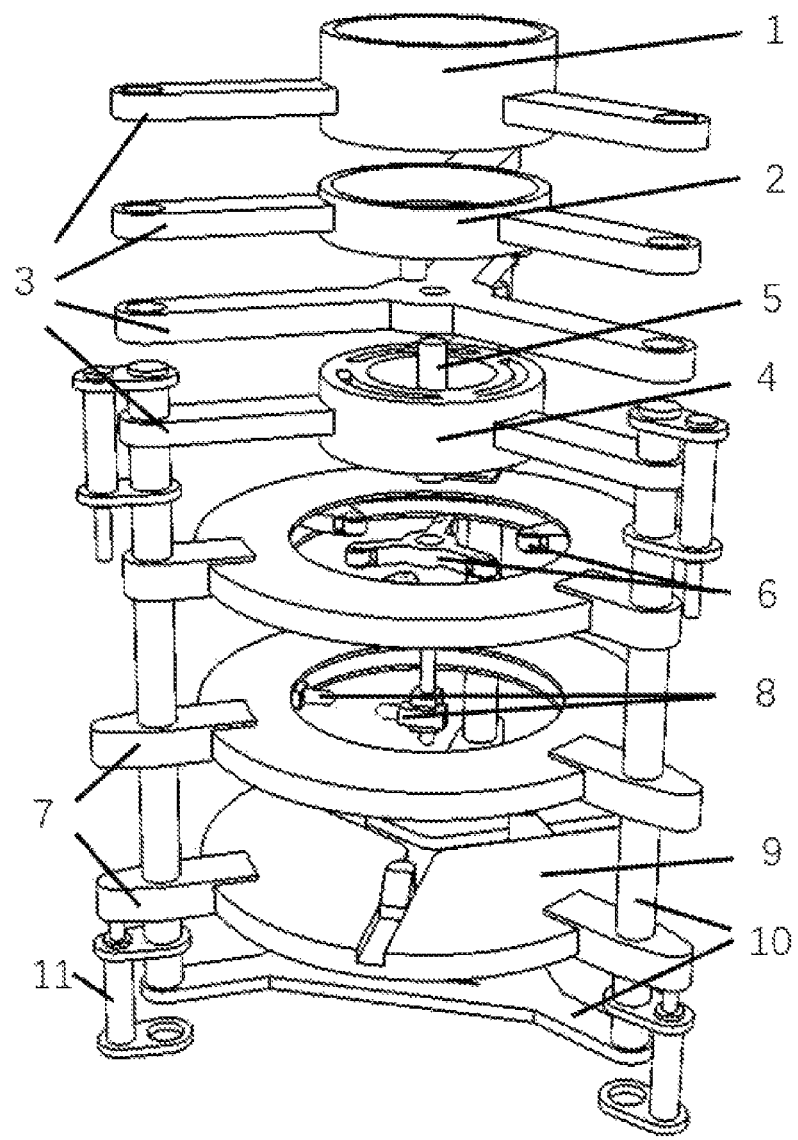
FIG. 2 is a three-dimensional exploded view of the equal additive manufacturing device.
Figure 3:
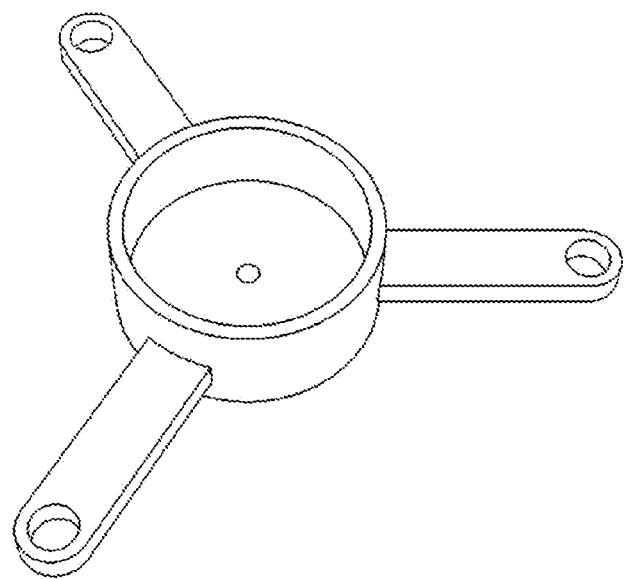
FIG. 3 is a schematic diagram of a smelting device in FIG. 1 and FIG. 2.
Figure 4:
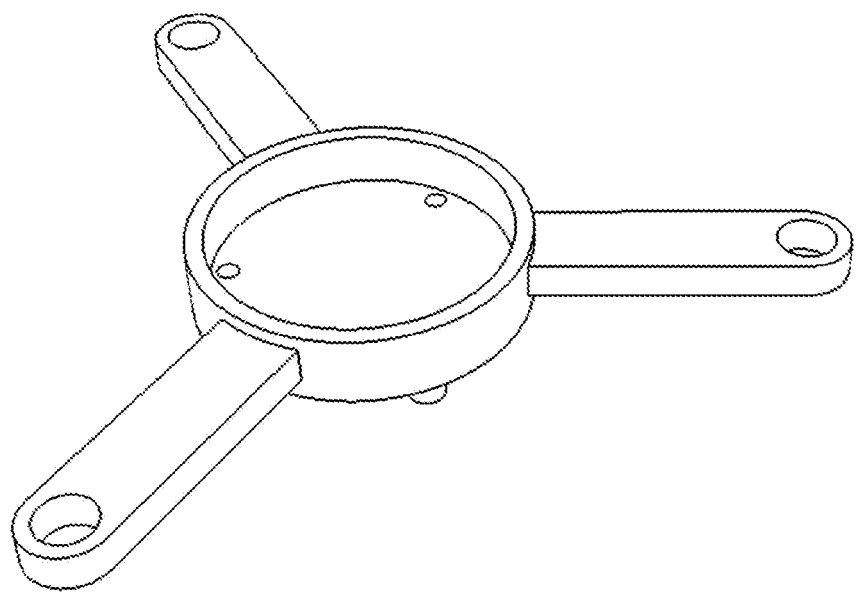
FIG. 4 is a schematic diagram of an intermediate container in FIG. 1 and FIG. 2.
Figure 5:
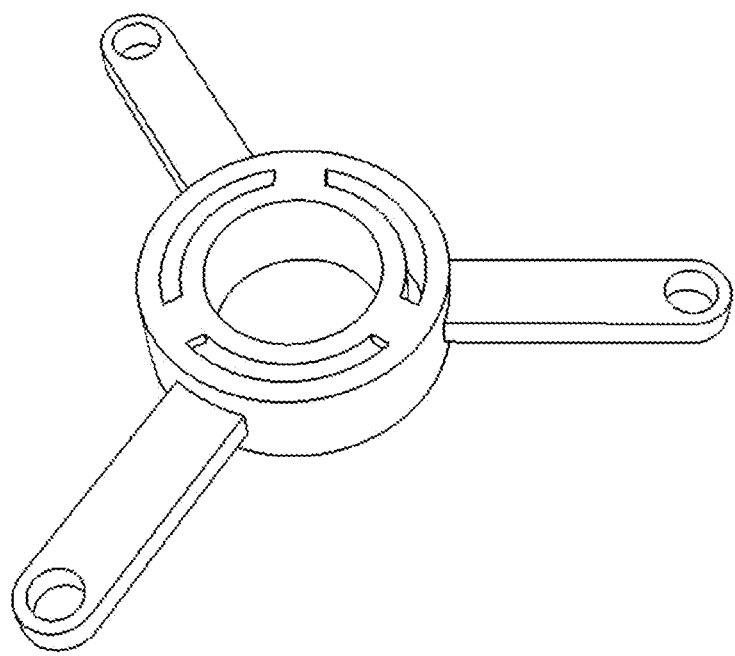
FIG. 5 is a schematic diagram of a crystallizer in FIG. 1 and FIG. 2.
Figure 6:
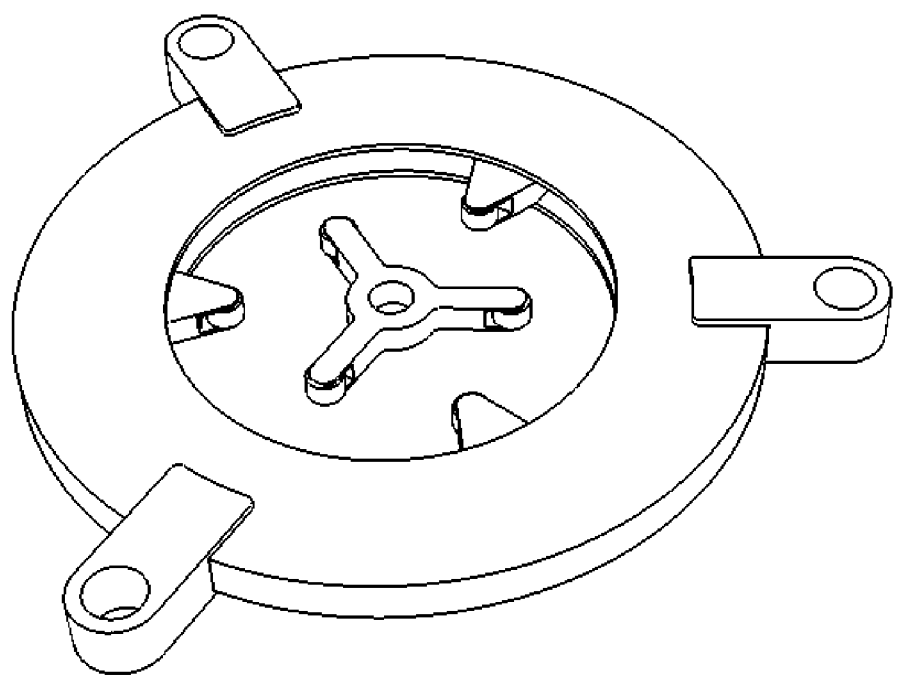
FIG. 6 is a schematic diagram of a roll in FIG. 1 and FIG. 2.
Figure 7:
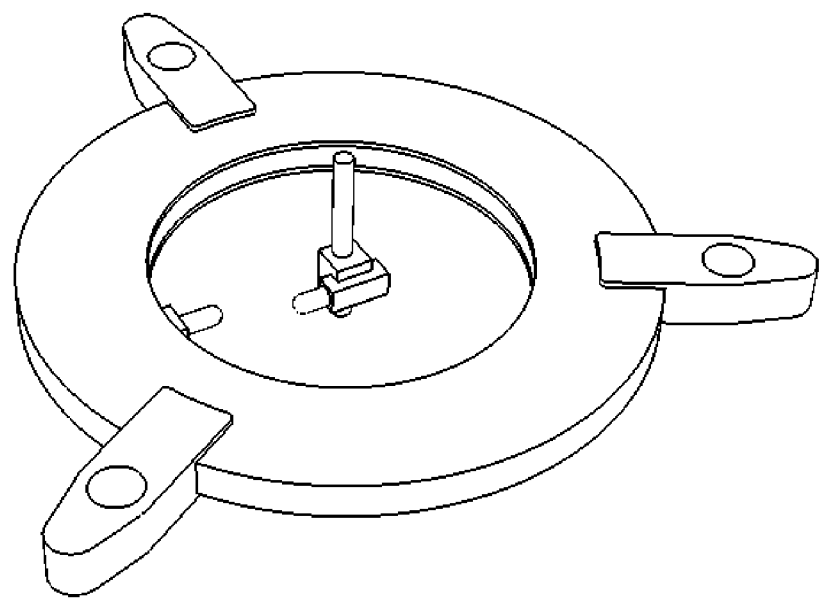
FIG. 7 is a schematic diagram of a point forming machine in FIG. 1 and FIG. 2.
Figure 8:
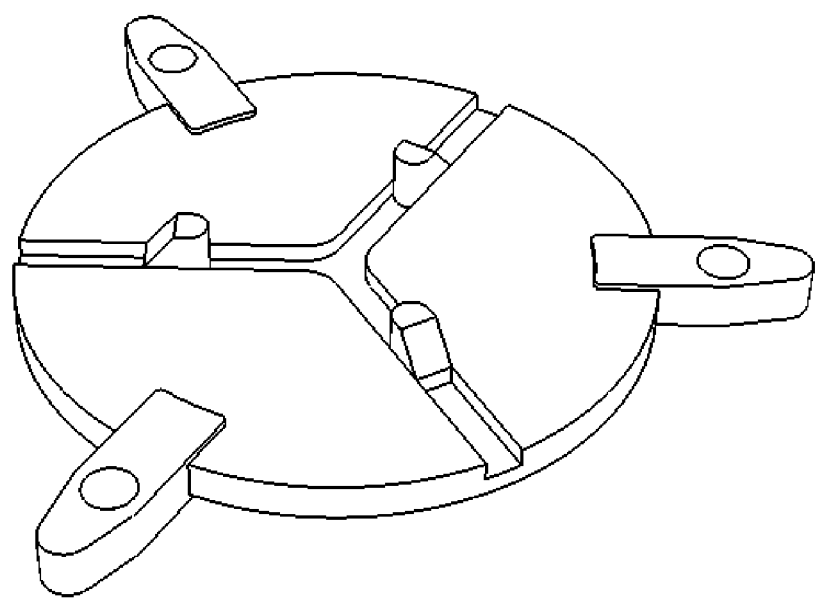
FIG. 8 is a schematic diagram of a chuck in FIG. 1 and FIG. 2.
Figure 9:
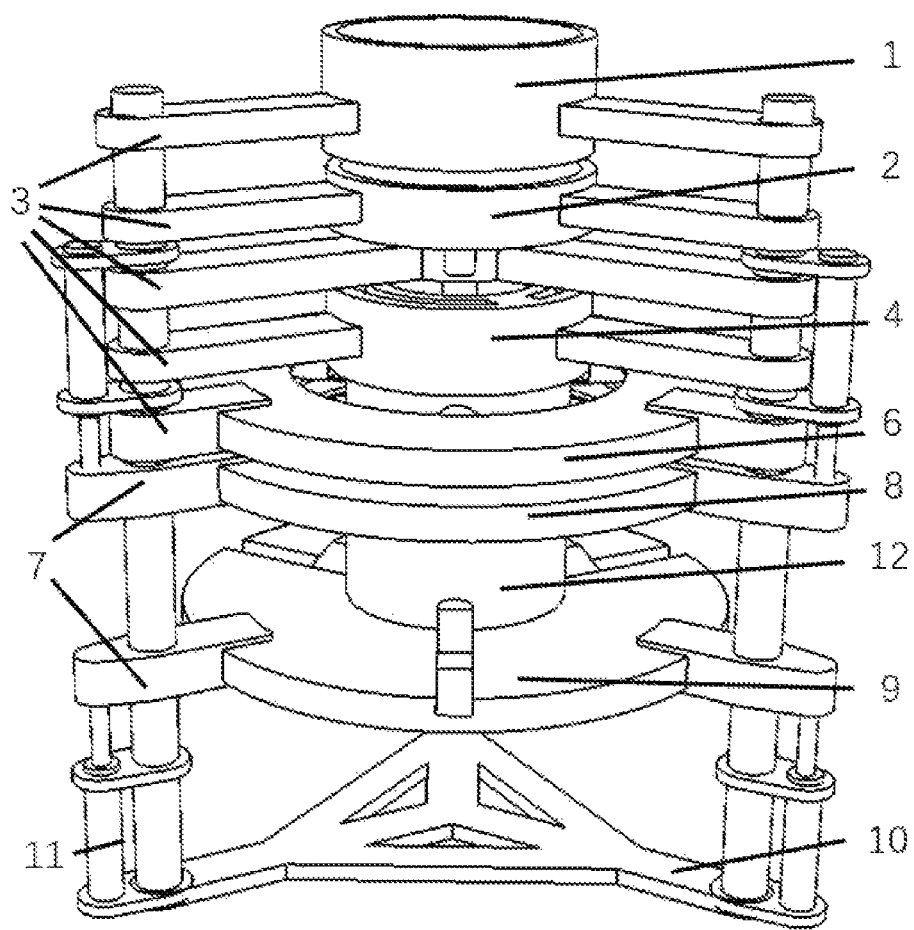
FIG. 9 is a three-dimensional diagram in an equal additive manufacturing process.

As shown in FIG. 1 and FIG. 2, a composite equal additive manufacturing device applied to the abovementioned composite equal additive manufacturing method includes a metal smelting device 1, a fixed bracket 3, an intermediate container 2, a crystallizer 4, a mandrel 5, plastic forming tools, such as rolls 6, a guide sleeve, plastic forming devices, such as point forming machines 8, a temperature control device, a chuck 9, a machine frame 10, a hydraulic cylinder 11, and the like. The overall layout is of a vertical structure. The metal smelting device 1, the intermediate container 2, and the crystallizer 4 are fixed to the machine frame 10 through the fixed bracket 3, and the three are arranged in sequence from top to bottom along a central axis. The rolls 6 and the point forming machines 8 all include an inner part and an outer part, including inner rolls and outer rolls, and an inner point forming machine and an outer point forming machine. All of the inner rolls and the inner point forming machine may rotate around the mandrel 5. The outer rolls and the outer point forming machine are placed in circular guide rails of respective discs. Discs for installing the rolls 6 and the point forming machines 8 are in sliding connection with the machine frame 10 through a sliding guide sleeve 7. The outer rolls and the outer point forming machine rotate in the circular guide rails of the discs by taking the mandrel 5 as a central line. The machine frame 10 consists of a base plate and a guide rod. A bottom end of the mandrel 5 is fixed to the center of the base plate, and a top penetrates through the chuck 9, the point forming machines 8 and the rolls 6. The fixed bracket 3 is fixedly connected to the machine frame 10. The sliding guide sleeve 7 may move up and down along the guide rod of the machine frame 10.

A control part is also arranged in the abovementioned composite equal additive manufacturing device. For example, the working parameters of the metal smelting device 1, the cooling speed of the crystallizer 4, the rotating speed of the rolls 6, the working parameters of the point forming machine 8, the heating power of the temperature control device, the up-down moving speed and the stroke of the guide sleeve used for fixing the chuck 9, and the like are all controlled by a general controller of the control part (the general controller is not reflected in the drawings).

FIG. 1 and FIG. 2 respectively give a three-dimensional diagram and a three-dimensional exploded diagram of the composite equal additive manufacturing device of the implementation manner of the present disclosure, which reflect a positional relationship of various main structures. A part with a certain complex structure is machined by using orderly cooperation of various structures. The present embodiment is only a preferred implementation device, and various structures can be designed in a variety of ways as long as they can complete corresponding functions.

For those skilled in the art, it is obvious that the present disclosure is not limited to the details of the above exemplary embodiments, and can be implemented in other specific forms without departing from the spirit or basic features of the present disclosure. Therefore, from any point of view, the embodiments should be regarded as exemplary but not restrictive. The scope of the present disclosure is limited by the attached claims rather than the above description. Therefore, it is intended to include all changes within the meaning and scope of the equivalent elements of the claims in the present disclosure, and any numeral in the claims shall not be regarded as limiting the claims involved.

In the present disclosure, specific examples are applied to illustrate the principle and implementation manner of the present disclosure. The description of the above embodiment is only used to help understand the method and core idea of the present disclosure. Meanwhile, for those of ordinary skill in the art, there will be changes in the specific implementation manner and scope of application according to the idea of the present disclosure. In conclusion, the content of the present description shall not be construed as a limitation to the present disclosure.

What is claimed is:

1. A composite equal additive manufacturing method, comprising the following steps:
   S1, obtaining molten metal by using a metal smelting device;
   S2, storing the molten metal flowing out from the metal smelting device in an intermediate container, and transferring the molten metal stored in the intermediate container into a crystallizer below through a gate when the molten metal flowing into the intermediate container meets a forming amount of a part to be formed;
   S3, controlling the crystallizer to cool the molten metal from a liquid state to a solid-liquid mixed state, and enabling a blank body with a required section to flow out from an outlet of the crystallizer;
   S4, arranging one or more pairs of plastic forming tools at a bottom of the outlet of the crystallizer, and performing hot machining on the blank body with fluidity by the one or more pairs of plastic forming tools;
   S5, enabling the blank body after plastic forming to descend under an action of self gravity, wherein a chuck is used for clamping and fixing a lower end of a cooled and solidified blank body, and the blank body that is fixed descends along a guide sleeve on a machine frame;
   S6, performing local machining or finishing on the blank body on the chuck after the plastic forming by using one or more point forming machines, and simultaneously, adjusting and controlling a temperature of a machining part by using a temperature control device, so as to obtain a formed part with a locally deformed structure; and
   S7, after the formed part is formed, supporting the formed part by the chuck, enabling the formed part to descend to a bottom of the machine frame, and taking the formed part out from the machine frame.

2. The composite equal additive manufacturing method according to claim 1, wherein, in S1, one electrode of a power supply in an electroslag remelting furnace is directly placed in a slag pool, a hole is formed in a bottom of the slag pool, and the molten metal flows out from the hole in the bottom of the slag pool.

3. The composite equal additive manufacturing method according to claim 1, wherein in S2, the intermediate container is used for storing the molten metal and controlling a speed of the molten metal flowing into the crystallizer.

4. The composite equal additive manufacturing method according to claim 1, wherein the crystallizer is of a hollow axisymmetric structure or a hollow non-axisymmetric structure.

5. The composite equal additive manufacturing method according to claim 1, wherein in S4, the one or more pairs of plastic forming tools are one or more pairs of rolls; each pair of rolls comprises an inner roll and an outer roll; the inner roll rotates around a mandrel through a bearing; and the outer roll is placed in a disc fixed by the guide sleeve and rotates around the mandrel in a disc groove.

6. The composite equal additive manufacturing method according to claim 1, wherein in S5, a periphery of the chuck is connected to a sliding guide sleeve; and the sliding guide sleeve is assembled on a guide rod of the machine frame and is able to move up and down along the guide rod of the machine frame.

7. The composite equal additive manufacturing method according to claim 1, wherein the point forming machine comprises an inner point forming machine and an outer point forming machine, in S6, the inner point forming machine is able to rotate along a mandrel and is able to stretch and retract relative to the guide sleeve on the mandrel; the outer point forming machine is placed in a disc fixed by the guide sleeve and rotates around the mandrel in a disc groove; and the inner point forming machine and the outer point forming machine are used for machining a local structure on the blank body.

8. The composite equal additive manufacturing method according to claim 7, wherein the temperature control device is installed on or near a machining head of the point forming machine; and the temperature control device is used for adjusting and controlling the temperature of the machining part.

* * * * *